UNITED STATES PATENT OFFICE.

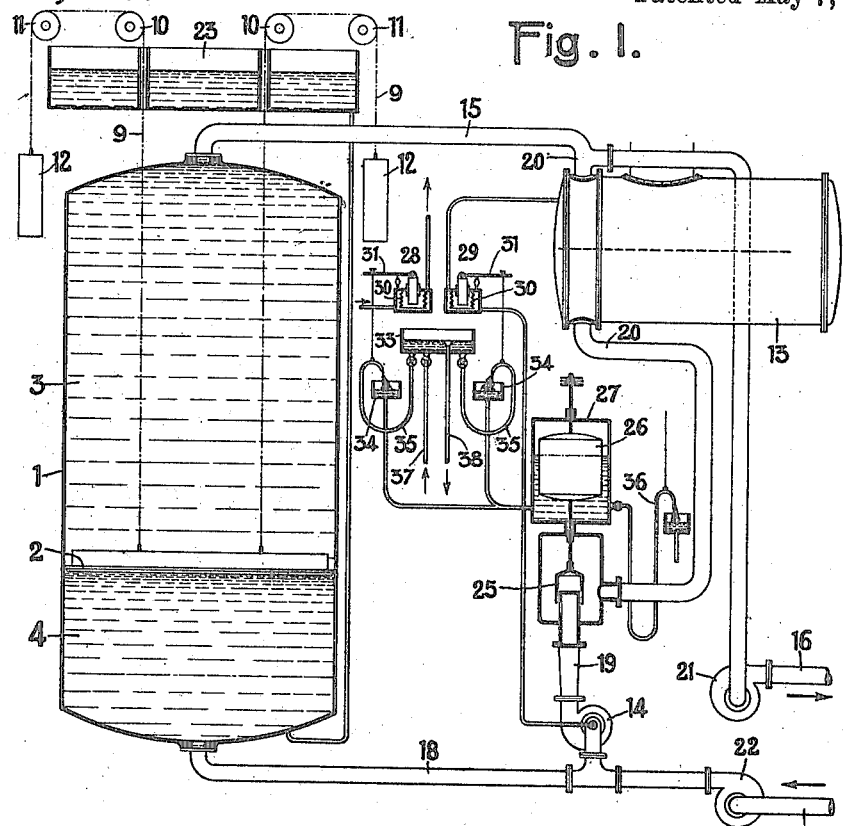
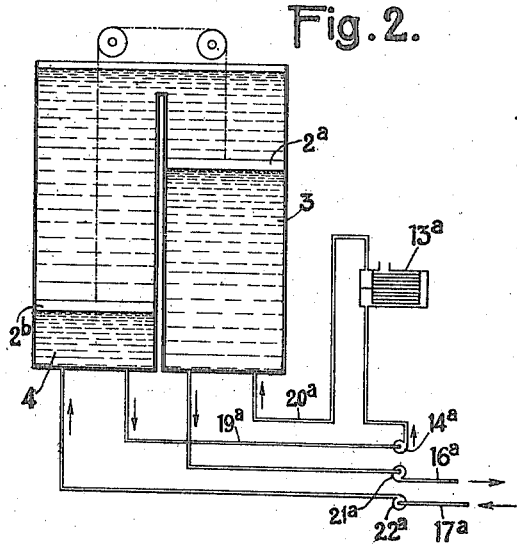

WILHELM ZÜBLIN, OF WINTERTHUR, SWITZERLAND.

HOT-WATER HEATING INSTALLATION.

1,265,020.　　　　　　　Specification of Letters Patent.　　　　Patented May 7, 1918.

Application filed July 21, 1917.　Serial No. 181,992.

*To all whom it may concern:*

Be it known that I, WILHELM ZÜBLIN, a citizen of the Swiss Republic, and resident of Winterthur, Switzerland, engineer, have invented new and useful Improvements in Hot-Water Heating Installations, of which the following is a full, clear, and exact specification.

This invention relates to a hot water heating installation wherein the water, which is heated in a heating apparatus, can be conveyed both to the distributing system and to a heat storage vessel, in either case by connection with the flow and return pipes. The invention is characterized by the arrangement wherein the heat storage vessel is divided by a heat insulating piston into an upper hot water and a lower cold water compartment, and wherein the quantity of water which flows through the distributing system as well as that which flows through the heating apparatus can be regulated through the medium of two independent circulating devices in such a manner that when a greater quantity of heated water is supplied than is necessary for the distributing system, the surplus water quantity is forced into the hot water compartment, while in the case of an under supply a supplementary quantity of hot water is supplied from the water compartment of the storer and cold water flows to the cold water compartment thereof.

As the heating apparatus there may be employed, for example, a surface condenser of a steam engine or a steam turbine plant in which the water is heated by the exhaust steam. The waste heat of any other heat engine such, for instance, as a gas or an oil motor or the like, can also be employed for the same purpose.

Apparatus of the above described type is especially suitable for distance heating in order to feed individual hot water plants or houses of inhabited districts or towns. In this connection the waste heat of a heat engine plant can be used in the central station, either wholly or partially, or in combination with other sources of heat.

Although the arrangement having only one dividing piston in the heat storage vessel is the simplest in practice it is also possible to make use of a construction in which the warm and cold water spaces of the storage vessel are arranged adjacent to one another, each being closed at the top by a piston, above which pistons there are arranged two water columns in connection with one another.

The drawing illustrates two plants for carrying out the invention, as applied to distance heating.

In the said drawing:—

Figure 1 is a sectional view of an arrangement having two superposed water compartments and a single piston in the heat storage vessel.

Fig. 2 is a similar view of a plant wherein the heat storage vessel comprises two water compartments arranged adjacent to one another and each having a piston, and Figs. 3 and 4 illustrate by partial vertical sections two suitable constructions of piston.

The heat storage vessel illustrated in Fig. 1 comprises an upright cylindrical vessel 1 of suitable diameter (in the case of large heat installations, probably 10 meters and over) which is separated by a piston 2 into two independent superposed compartments 3 and 4, the said vessel 1 being insulated to prevent the passage of heat outward. The upper compartment 3 is the hot water space, the lower 4 the cold water space. These compartments are variable in capacity by the movements of the piston 2, but in such a way that the sum of their capacities is always constant. The piston 2 constitutes a heat insulating partition between the two compartments 3 and 4. It can, for example, where it possesses a large diameter as is usually the case, be composed of a hollow body *a* of sheet-metal, as shown in Fig. 3, which is provided on the inside with a lining *b* of masonry or concrete for the purpose of heat insulation and of loading it against the lift of the water. It can, however, also be provided with a wooden lining *c*, a wood bottom *d*, a water-tight heat insulating cushion *e* superposed upon the bottom *d* and a loading plate *f* of concrete as shown in Fig. 4. In both cases it can be packed in the cylindrical vessel 1 by means of a packing consisting of movable segments 5 which, by means of weighted levers 6 and supporting fingers 7, are gripped in the angle between the cylindrical wall of the vessel and a flange 8 on the piston. The packing segments 5 can be composed of sheet-metal angle pieces with a packing lining as shown in Fig. 3, or of wood, as shown in Fig. 4. The piston 2 is suspended on two flexible members 9 which extend outside the vessel 1 and pass over guide rollers 10 and 11 and carry counter-weights 12 serving to balance the weight of the piston.

In this case a surface condenser 13 of a steam engine or a steam turbine plant or the like serves as the source of the heat, a centrifugal pump 14 forcing the water for the circulation through the same as required.

The hot water compartment 3 of the heat storage vessel is connected at the upper part by the pipe 15, the distributing system 16 and 17 which contains the heating devices (not shown) situated at a distance from the central station, and the pipe 18 with the lower part of the cold water compartment 4. The cold water compartment 4 is connected with the hot water compartment 3 by means of the said pipe 18, the heat receiving system 19 and 20, which contains the centrifugal pump 14 and the surface condenser 13, and the pipe 15.

In the heat distributing system, 16 indicates the flow pipe to the various heating devices and 17 the return pipe from the same, so that the heating appliances in all the houses, buildings, and the like are always connected between these flow and return pipes. In order to maintain the circulation of the water in the flow and return pipes use is made of the centrifugal pumps 21 and 22 which always deliver the same quantity of water. The deliveries of the pumps 21 and 22 correspond to the heat requirements of the whole of the houses, buildings, etc., while the pump 14 is arranged to pump a quantity of water through the surface condenser 13 which corresponds, according to the given temperatures, to the requirements of the motor plant in the central station.

The described heat storage arrangement has for its object to compensate, by the movements of its piston 2, for the requirements as regards cold or hot water. If the heat receiving system 19, 20 provides more hot water than corresponds to the consumption in the heat delivery system 16, 17 then the surplus hot water is supplied to the hot water compartment 3, the piston 2 moves downward and the cold water compartment 4 delivers cold water; the hot water compartment is thus increased in capacity and the cold water compartment diminished, although the sum of the capacities of these two compartments remains the same. The surplus hot water is, therefore, stored in the storage vessel. If, on the other hand, the heat receiving system 16, 17 provides less hot water than is necessary for the heat delivery or supply system 16, 17 then a surplus of cold water flows to the cold water compartment 4, the piston 2 is raised and the stored hot water is delivered from the hot water compartment 3 to the supply system 16, 17 as an addition to the hot water which is delivered from the heating apparatus in insufficient quantity. In this case the cold water compartment 4 is increased in capacity and the hot water compartment 3 diminished, although, as above stated, the sum of the two capacities remains constant. In these compensating movements of the piston 2 the two surfaces of the piston are in all positions subjected to approximately the same pressure of water. Above the closed vessel 1 there is arranged an expansion vessel 23 which is open at its upper part and is connected to the lower space 4 of the vessel 1 and in which a provision of water can be contained when necessary.

The delivery of the pump 14 can be regulated either automatically or by hand, and must be adapted, in the first place, to the requirements of the motor plant in the central station according to the temperatures prescribed for the heating system. From the differences of the actual delivery of this pump 14 and that of the circulating pumps 21 and 22 is automatically determined the play of the piston 2 which moves downward when the machine plant delivers more waste heat than the system requires and upward when the supply partially or wholly draws upon the supply of hot water stored above the piston.

In the automatic regulation of the delivery of the pump 14, as illustrated in Fig. 1, a slide-valve 25 is introduced into the pipe between the pump 14 and the surface condenser 13, the said valve 25 being controlled by a float 26. The latter is located in a vessel 27 in which the level of water is variable. The variation of water level in the said vessel 27 is effected by the alteration of the inlet of water thereto and its outlet therefrom. The supply to the vessel is controlled for this purpose by a cold regulator 28 and a warm regulator 29, while the delivery pipe is controlled by the governor of the machine to which the condenser 13 is connected. The regulators 28 and 29 each consist of an expansible vessel 30 which, according to its expansion capacity, acts through the medium of a movable piston upon a lever 31 which can rise to a greater or less extent relatively to the water level in a supply vessel 33, the delivery end of an over-flow pipe 35, which is fitted to the said vessel 33, in order to permit of a smaller or larger quantity of water flowing from the vessel 33 into an over-flow vessel 34 connected with the float vessel 27. In the case of the cold regulator 28 the expansion vessel 30 is surrounded by the atmosphere, while in the case of the warm regulator 29 the said vessel is surrounded by warm water flowing from the condenser 13. If the external temperature changes, other conditions remaining the same, the cold regulator 28 allows more or less water to flow into the float vessel 27, the float 26 rises more or less and the valve 25 is opened more or less for the flow of cold water through the surface condenser 13. In a corresponding manner and according to the temperature of the water coming from the condenser 13 the warm regulator 29 allows, through the medium of the over-flow pipe 35 attached thereto, more or less water to flow to the float vessel 27 in order to adjust the valve 25. Furthermore, if the engine governor alters, for example, when less waste steam is delivered, the movement of the said governor in this case comes into action in connection with an overflow pipe 36, connected to it by suitable link mechanism, in such a manner that the discharge opening thereof is correspondingly lowered, a larger quantity of water flows from the float vessel 27, the float 26 drops and the slide-valve 25 moves to the closing position. The means by which these operations can be effected can obviously be modified in many ways. The water level in the feed vessel 33 to which the water is supplied through the pipe 37 is maintained at a constant height by means of an over-flow pipe 38.

In the construction illustrated in Fig. 2 the hot water compartment 3 and the cold water compartment 4 are arranged adjacent to one another and are closed at the upper part by pistons 2ª and 2ᵇ respectively. The two pistons 2ª, 2ᵇ are balanced and arranged to move together in such a manner that when the one moves upward the other moves downward and vice versa, care being, however, taken, as in the construction above described, that the sum of the capacities of the two water compartments 3, 4 remains constant. Above the pistons 2ª, 2ᵇ, which limit the water compartments 3, 4 in the upward direction, there are arranged two water columns in connection with one another in order that in any position of the pistons the water pressures thereon practically balance one another. This arrangement has the advantage that the pistons are easily accessible from the outside. In this case, also, the water heater (condenser) 13ª with the delivery pump 14ª is connected up in a heat receiving system 19ª and 20ª extending from the cold water compartment 4 to the hot water compartment 3, while the hot water distributing system 16ª, 17ª with its delivery pumps 21ª, 22ª and the distant heating plants which are not illustrated are also connected to the lower end of the water compartments 3, 4.

What I claim is:

1. In a hot water heating installation, a heater for heating water, a hot water distributing system, a heat storer having two separate spaces, one for cold water, the other for hot water, both connected with the said heater and said hot water distributing system, and two independent circulating devices, one inserted between the said heater and the cold water space of said heat storer and the other inserted into said hot water distributing system for supplying the same with circulating water, the said circulating devices being so arranged that when a larger quantity of heated water is provided than is necessary for the hot water distributing system, the surplus water quantity is forced into the hot water space of the storer, while in the case of an under supply a supplementary quantity of hot water is supplied from the hot water compartment of the storer and cold water flows to the cold water compartment thereof.

2. In a hot water heating installation, a heater for heating water, a hot water distributing system, a heat storage vessel with a heat insulating piston arranged therein to form two superimposed separate spaces, the lower one for cold water and the upper for hot water, both connected with the said heater and said hot water distributing system, and two independent circulating devices, one inserted between the said heater and the cold water space of said heat storer and the other inserted into said hot water distributing system for supplying the same with circulating water, the said circulating devices being so arranged that when a larger quantity of heated water is provided than is necessary for the hot water distributing system, the surplus water quantity is forced into the hot water space of the storage vessel, while in the case of an under supply a supplementary quantity of hot water is supplied from the hot water compartment of the storage vessel and cold water flows to the cold water compartment thereof.

3. In a hot water heating installation, a heater for heating water, a hot water distributing system, a heat storer having two separate spaces, one for cold water, the other for hot water, both connected with said heater and said hot water distributing system, two independent circulating devices, one inserted between the said heater and the cold water space of said heat storer and the other inserted into said hot water distributing system for supplying the same with circulating water, a regulating valve interposed in the connection to said heater to regulate the flow of cold water thereto in dependence of a variable service condition, the said circulating devices being so arranged that when a larger quantity of heated water is provided than is necessary for the hot water distributing system, the surplus quantity is forced into the hot water space of the storer, while in the case of an under supply a supplementary quantity of hot water is supplied from the hot water compartment of the storer and cold water flows to the cold water compartment thereof.

4. In a hot water heating installation, a heater for heating water, a hot water distributing system, a heat storer having two separate spaces, one for cold water, the other for hot water, both connected with the said heater and said hot water distributing system, two independent circulating devices, one inserted between the said heater and the cold water space of said heat storer and the other inserted into said hot water distributing system for supplying the same with circulating water, a regulating valve interposed in the connection to said heater to regulate the flow of cold water thereto, in combination with a float control device for said regulating valve arranged to operate in dependence of temperature variations, the said circulating devices being so arranged that when a larger quantity of heated water is provided than is necessary for the hot water distributing system, the surplus water quantity is forced into the hot water space of the storer, while in the case of an under supply a supplementary quantity of hot water is supplied from the hot water compartment of the storer and cold water flows to the cold water compartment thereof.

5. In a hot water heating installation, a heater for heating water, a hot water distributing system, a heat storer having two separate spaces, one for cold water, the other for hot water, both connected with the said heater and said hot water distributing system, and circulating means, connected with the said heater and the said heat storer as well as with the hot water distributing system and so arranged that when a larger quantity of heated water is provided than is necessary for the hot water distributing system, the surplus water quantity is forced into the hot water space of the storer, while in the case of an under supply a supplementary quantity of hot water is supplied from the hot water compartment of the storer and cold water flows to the cold water compartment thereof.

In witness whereof I have hereunto signed my name this 29th day of June, 1917, in the presence of two subscribing witnesses.

WILHELM ZÜBLIN.

Witnesses:
 AMAND RITTERY,
 AMAND BRAUN.

Copies of this patent may be obtained for five cents each, by addressing the "Commissioner of Patents, Washington, D. C."